US012710760B2

(12) United States Patent
Wang et al.

(10) Patent No.: US 12,710,760 B2
(45) Date of Patent: Aug. 18, 2026

(54) STATE DETERMINATION METHOD AND APPARATUS FOR CLEANING ROBOT

(71) Applicant: Beijing Roborock Innovation Technology Co., Ltd., Beijing (CN)

(72) Inventors: Lei Wang, Beijing (CN); Yansheng Niu, Beijing (CN)

(73) Assignee: Beijing Roborock Innovation Technology Co., Ltd., Beijing (CN)

( * ) Notice: Subject to any disclaimer, the term of this patent is extended or adjusted under 35 U.S.C. 154(b) by 111 days.

(21) Appl. No.: 18/725,744

(22) PCT Filed: Jul. 12, 2022

(86) PCT No.: PCT/CN2022/105275

§ 371 (c)(1),
(2) Date: Jun. 28, 2024

(87) PCT Pub. No.: WO2023/124009

PCT Pub. Date: Jul. 6, 2023

(65) Prior Publication Data

US 2025/0060753 A1 Feb. 20, 2025

(30) Foreign Application Priority Data

Dec. 31, 2021 (CN) ........................ 202111677232.7

(51) Int. Cl.
*G05D 1/245* (2024.01)
*A47L 11/40* (2006.01)
(Continued)

(52) U.S. Cl.
CPC .......... *G05D 1/245* (2024.01); *A47L 11/4002* (2013.01); *A47L 11/4011* (2013.01); *G05D 2105/10* (2024.01); *G05D 2111/52* (2024.01)

(58) Field of Classification Search
CPC ............... G05D 1/245; G05D 2105/10; G05D 2111/52; A47L 11/4002; A47L 11/4011;
(Continued)

(56) References Cited

U.S. PATENT DOCUMENTS 5,020,620 A 6/1991 Field
9,335,767 B2 * 5/2016 Jang .................... G05D 1/0227
(Continued)

FOREIGN PATENT DOCUMENTS

CN 105302140 A 2/2016
CN 105334850 A 2/2016
(Continued)

OTHER PUBLICATIONS

International Search Report issued in the corresponding Application No. PCT/CN2022/105275, mailed Oct. 11, 2022.
(Continued)

*Primary Examiner* — Andrew R Dyer
(74) *Attorney, Agent, or Firm* — Morgan, Lewis & Bockius LLP

(57) ABSTRACT

A state determination method and apparatus for a cleaning robot are provided. The method includes: acquiring a working mode of the cleaning robot in real time; based on the working mode, acquiring a target accumulation threshold corresponding to the working mode; based on the target accumulation threshold, performing selection and accumulation of respective angle change values detected within a preset duration to obtain an accumulated change value; and determining a state of the cleaning robot based on the accumulated change value.

13 Claims, 3 Drawing Sheets

(51) Int. Cl.
*G05D 105/10* (2024.01)
*G05D 111/50* (2024.01)

(58) Field of Classification Search
CPC .... A47L 9/2805; A47L 9/2826; A47L 9/2852; Y02E 10/50
USPC ........................................................ 701/23
See application file for complete search history.

(56) References Cited

U.S. PATENT DOCUMENTS

2006/0237634 A1* 10/2006 Kim ........................ G01S 17/48 250/221
2008/0281470 A1* 11/2008 Gilbert, Jr. .......... B60L 15/2036 901/1
2013/0054026 A1 2/2013 Jang et al.
2013/0138247 A1* 5/2013 Gutmann ............... G05D 1/028 901/1
2014/0129027 A1* 5/2014 Schnittman .......... G05D 1/0219 700/253
2018/0001474 A1* 1/2018 Sinyavskiy ............ B25J 9/1697
2018/0206688 A1* 7/2018 Chao ................... A47L 11/4011
2019/0161988 A1* 5/2019 Attar ..................... E04H 4/1654
2019/0246852 A1* 8/2019 Klintemyr ............ G05D 1/0088
2019/0324465 A1* 10/2019 Liu ........................ B25J 9/1666
2020/0186080 A1* 6/2020 Zhu ......................... B08B 11/04
2020/0275816 A1* 9/2020 Li ....................... A47L 11/4011
2021/0034061 A1* 2/2021 Yun ..................... A47L 11/4038
2021/0034062 A1* 2/2021 Ahn ...................... A47L 11/282
2021/0041871 A1* 2/2021 Lai .......................... A47L 9/009
2021/0096580 A1* 4/2021 Li ......................... G01S 17/931
2021/0302964 A1* 9/2021 Lai ........................ G01S 17/931
2021/0401251 A1* 12/2021 Dai ..................... A47L 11/4011
2022/0187841 A1* 6/2022 Ebrahimi Afrouzi ........................ G05D 1/0272
2022/0314442 A1* 10/2022 Naderer ............... B25J 15/0019
2023/0101031 A1* 3/2023 Uno ..................... B60W 40/114 701/23
2023/0249353 A1* 8/2023 Yan ...................... G06V 10/761 700/259
2024/0085916 A1* 3/2024 Izhikevich ............. G06V 10/82
2024/0310856 A1* 9/2024 He ........................... A47L 1/02

FOREIGN PATENT DOCUMENTS

CN 106774359 A 5/2017
CN 106959695 A 7/2017
CN 107569181 A 1/2018
CN 109394095 A 3/2019
CN 109662658 A 4/2019
CN 109885607 A 6/2019
CN 110403539 A 11/2019
CN 110522369 A 12/2019
CN 112327837 A 2/2021
CN 112704444 A 4/2021
CN 113031635 A 6/2021
CN 114587218 A 6/2022
JP H05184489 A 7/1993
JP H08-069321 A 3/1996
JP H08161048 A 6/1996
JP 2005141636 A 6/2005
JP 2009032179 A 2/2009
JP 2018-120572 A 8/2018
JP 2021-120837 A 8/2021
JP 2022-505523 A 1/2022
TW 201519842 A 6/2015
WO 2021153176 A1 8/2021

OTHER PUBLICATIONS

First Office Action issued in the corresponding CN Application No. 202111677232.7, dated Dec. 21, 2022.
Office Action issued in corresponding Japanese Patent Application No. 2024-539505, dated May 13, 2025.
Search Report issued in corresponding Japanese Patent Application No. 2024-539505, dated May 16, 2025.

* cited by examiner

STATE DETERMINATION METHOD AND APPARATUS FOR CLEANING ROBOT

CROSS-REFERENCE TO RELATED APPLICATION

This application is a U.S. National Stage of International Application No. PCT/CN2022/105275, filed on Jul. 12, 2022, which claims priority of the Chinese Patent Application No. 202111677232.7 filed on Dec. 31, 2021, contents of which are incorporated herein by reference in their entireties as a part of this application.

TECHNICAL FIELD

The present disclosure relates to household appliances, and in particular to a state determination method and apparatus for a cleaning robot.

BACKGROUND

With the continuous development of science and technologies, the popularity of cleaning robots has gradually increased. The cleaning robots can be used to quickly remove dust, foreign objects and the like, making people's lives more convenient and comfortable.

Since a robot performs cleaning based on a map, it needs to sense whether it is dragged or moved, whether it deviates, etc. Thus, a gyroscope (Gyro) is usually disposed in a cleaning robot, and a change of the Gyro is used to sense an angle change, and then whether the cleaning robot is dragged or moved or whether the cleaning robot deviates is determined—that is, a state of the cleaning robot is determined.

In an existing state determination method for a cleaning robot, a fixed threshold is set, then an angle change value is compared with the fixed threshold to obtain an accumulated angle change value, and finally whether the state of the cleaning robot is that the cleaning robot has been dragged or moved or the cleaning robot has deviated or the like is determined based on the accumulated change value. Under this premise, how to accurately determine a current state of the cleaning robot is particularly important.

SUMMARY

According to an aspect, the present disclosure provides a state determination method for a cleaning robot. The method includes:

- acquiring a working mode of the cleaning robot in real time;
- based on the working mode, acquiring a target accumulation threshold corresponding to the working mode;
- based on the target accumulation threshold, performing selection and accumulation of respective angle change values detected within a preset duration to obtain an accumulated change value; and
- determining a state of the cleaning robot based on the accumulated change value.

According to another aspect, the present disclosure provides a state determination apparatus for a cleaning robot. The apparatus includes:

- an angle change value detection module configured to detect an angle change value of the cleaning robot in real time;
- a first acquisition module configured to acquire a working mode of the cleaning robot in real time;
- a second acquisition module configured to, based on the working mode, acquire a target accumulation threshold corresponding to the working mode;
- an accumulation module configured to, based on the target accumulation threshold, perform selection and accumulation of respective angle change values detected by the angle change value detection module within a preset duration to obtain an accumulated change value; and
- a determination module configured to determine a state of the cleaning robot based on the accumulated change value.

According to still another aspect, the present disclosure provides a storage medium storing a computer program. When the computer program is executed by a processor, steps of the state determination method for the cleaning robot as described above are implemented.

According to yet still another aspect, the present disclosure provides an electronic device. The electronic device includes at least a memory and a processor. The memory stores a computer program thereon, and the processor implements the steps of the state determination method for the cleaning robot as described above when executing the computer program on the memory.

The above description is only an overview of the technical solutions of the present disclosure. In order to more clearly understand the technical means of the present disclosure, it can be implemented according to the content of the description. In order to make the above and other purposes, features and advantages of the present disclosure more obvious and easier to understand, the example embodiments of the present disclosure are listed below.

BRIEF DESCRIPTION OF THE DRAWINGS

Various other advantages and benefits will become apparent to those of ordinary skill in the art by reading the following detailed description of example embodiments. The accompanying drawings are only for the purpose of illustrating the example embodiments and are not to be construed as limiting the present disclosure. In addition, throughout the accompanying drawings, the same reference signs are used to denote the same components. In the accompanying drawings.

DETAILED DESCRIPTION

Various solutions and features of the present disclosure are described herein with reference to the accompanying drawings.

It should be understood that various modifications may be made to the embodiments of the present disclosure herein. Therefore, the above description should not be regarded as limiting, but merely as exemplifications of embodiments. Those skilled in the art will conceive other modifications within the scope and spirit of the present disclosure.

The accompanying drawings, which are incorporated in and constitute a part of the description, illustrate embodiments of the present disclosure and, together with the general description of the present disclosure given above and the detailed description of the embodiments given below, serve to explain the principles of the present disclosure.

These and other characteristics of the present disclosure will become apparent from the following description of preferred forms of embodiments given as non-limiting examples with reference to the accompanying drawings.

It should also be understood that although the present disclosure has been described with reference to some specific examples, those skilled in the art will be able to readily implement many other equivalent forms of the present disclosure.

With reference to the accompanying drawings, the above and other aspects, features and advantages of the present disclosure will become more apparent in view of the following detailed description.

Specific embodiments of the present disclosure are described hereinafter with reference to the accompanying drawings; however, it should be understood that the embodiments applied for are merely examples of the present disclosure, which can be implemented in various ways. Well-known and/or repetitive functions and structures are not described in detail to avoid obscuring the present disclosure with unnecessary or redundant details. Therefore, specific structural and functional details herein are not intended to be limiting, but merely to serve as a basis and representative basis of the claims to teach those skilled in the art to variously employ the present disclosure in substantially any appropriately detailed structure.

Phrases "in one embodiment," "in another embodiment," "in yet another embodiment," or "in other embodiments" may be used herein, all of which may refer to one or more of the same or different embodiments according to the present disclosure.

Figure 1:
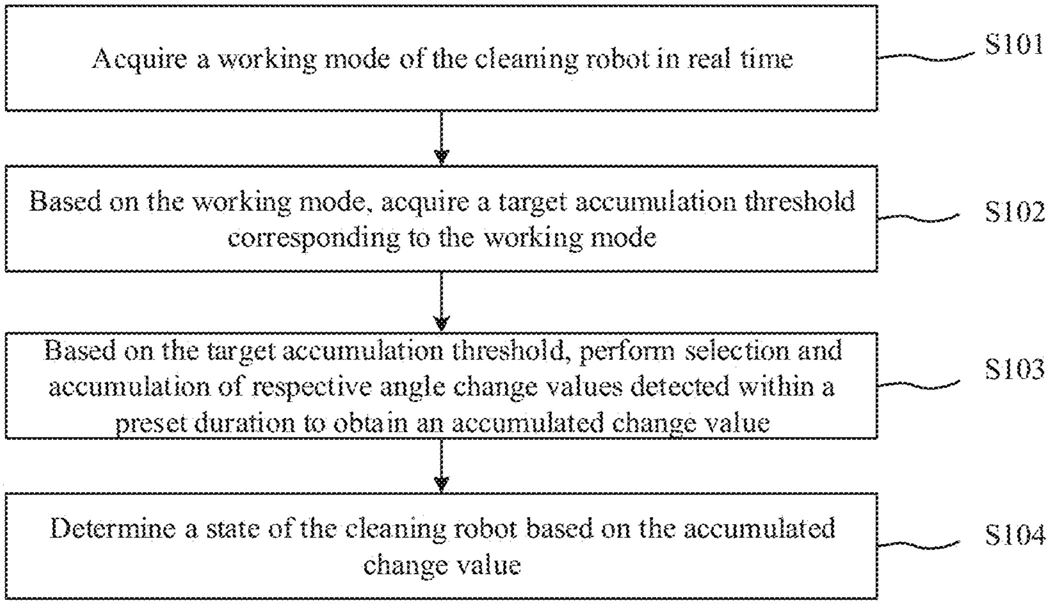
FIG. 1 is a flowchart of a state determination method for a cleaning robot according to an embodiment of the present disclosure.

An embodiment of the present disclosure provides a state determination method for a cleaning robot, as shown in FIG. 1. The method includes the following steps.

In S101, a working mode of the cleaning robot is acquired in real time.

In this step, the working mode may specifically be a first working mode with a swinging state or a second working mode with a non-swinging state. For example, the first working mode may be an automatic cleaning mode of a mopping cloth, a vibration mopping mode, etc.; and the second working mode may be a charging mode, a sweeping mode, a mopping mode, etc.

In S102, a target accumulation threshold corresponding to the working mode is acquired based on the working mode.

In this step, different working modes correspond to different accumulation thresholds, that is, the first working mode corresponds to a first accumulation threshold, the second working mode corresponds to a second accumulation threshold, and the first accumulation threshold is less than the second accumulation threshold.

In S103, selection and accumulation of respective angle change values detected within a preset duration are performed based on the target accumulation threshold to obtain an accumulated change value.

In this step, after the target accumulation threshold is acquired, angle change value(s) greater than or equal to the target accumulation threshold within the preset duration may be accumulated according to the target accumulation threshold, and angle change value(s) less than the target accumulation threshold may be excluded, so as to accurately obtain the accumulated change value. Since the first accumulation threshold corresponding to the first working mode is less than the second accumulation threshold corresponding to the second working mode, when the cleaning robot is in a slight shaking/swinging working mode, angle change value(s) which are detected at various moments and are greater than or equal to the first accumulation threshold may be accumulated based on the smaller first accumulation threshold so as to make the accumulated change value obtained more accurate and avoid a situation that an accumulated result has an error because smaller angle change value(s) are not accumulated (this situation may cause the cleaning robot to mistakenly think that it has been shifted, e.g., causing the robot to mistakenly think that it is dragged, or is moved or it deviates).

In S104, a state of the cleaning robot is determined based on the accumulated change value.

In this step, after the accumulated change value is obtained, the state of the cleaning robot may be determined based on the accumulated change value, that is, whether the cleaning robot deviates or is moved or dragged or the like is determined.

In the state determination method for the cleaning robot according to the present embodiment, the target accumulation threshold is adjusted in real time according to the working mode of the cleaning robot, and then angle change value(s) satisfying a condition is(are) accumulated based on the target accumulation threshold. Thus, the accumulated change value obtained via accumulation is more accurate and reliable, thereby providing a guarantee for subsequent accurate determination of the state of the cleaning robot based on the accumulated change value.

Figure 2:
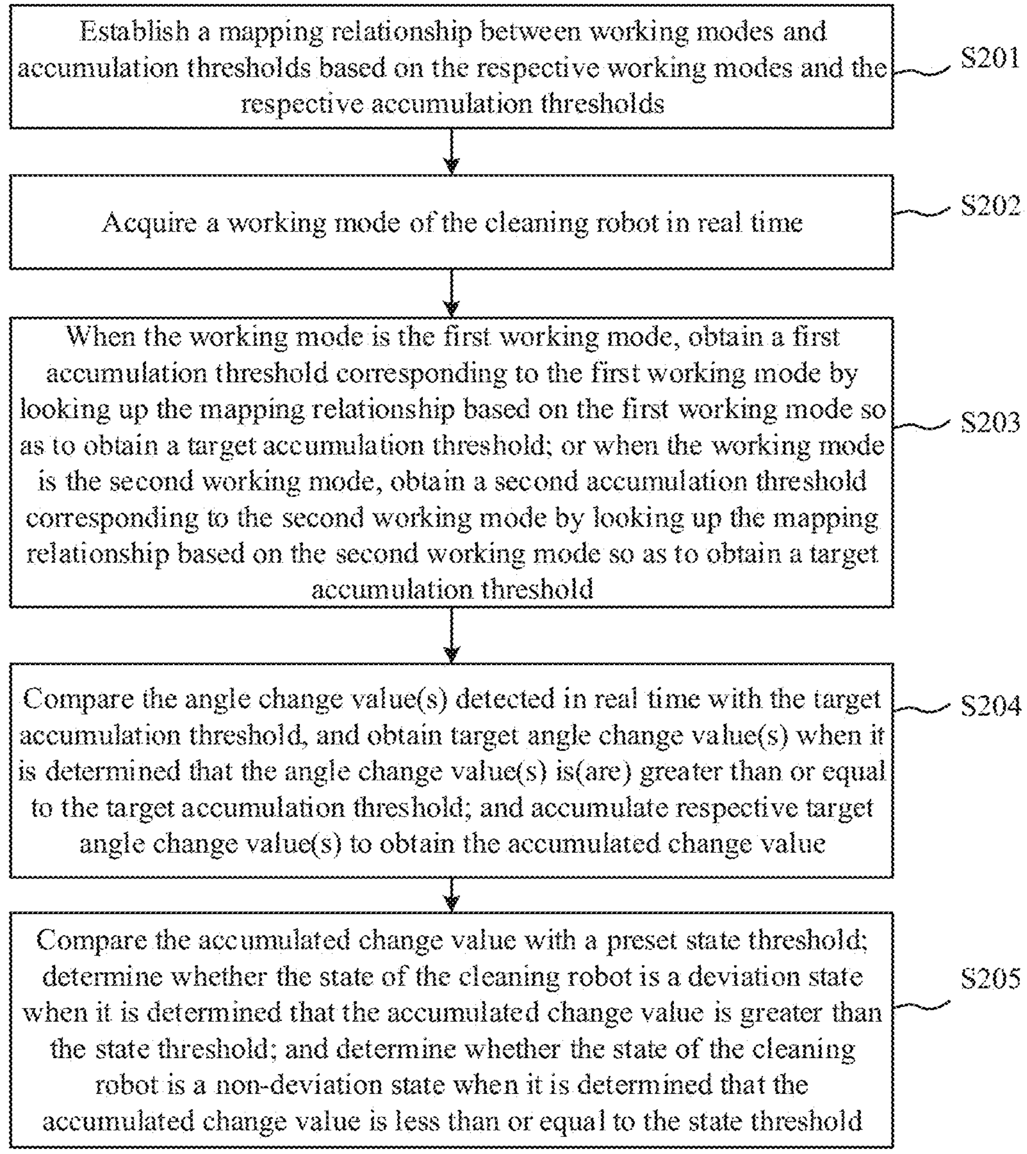
FIG. 2 is a flowchart of a state determination method for a cleaning robot according to another embodiment of the present disclosure.

Another embodiment of the present disclosure provides a state determination method for a cleaning robot, as shown in FIG. 2. The method includes the following steps.

In S201, a mapping relationship between working modes and accumulation thresholds is established based on the respective working modes and the respective accumulation thresholds.

In this step, the working modes include: a first working mode with a swinging state and a second working mode with a non-swinging state. The accumulation thresholds specifically include a first accumulation threshold corresponding to the first working mode, or a second accumulation threshold corresponding to the second working mode. The first accumulation threshold is less than the second accumulation threshold. That is, in this step, a mapping relationship between the first working mode and the first accumulation threshold and between the second working mode and the second accumulation threshold is established. In a specific implementation, an angle range of the first accumulation threshold may be 0.00010 to 0.003°; and an angle range of the second accumulation threshold may be 0.010 to 0.3°. Of course, the angle range may also be adjusted according to actual needs.

In S202, a working mode of the cleaning robot is acquired in real time.

In S203, when the working mode is the first working mode, a first accumulation threshold corresponding to the first working mode is obtained by looking up the mapping relationship based on the first working mode so as to obtain a target accumulation threshold; or when the working mode is the second working mode, a second accumulation threshold corresponding to the second working mode is obtained by looking up the mapping relationship based on the second working mode so as to obtain a target accumulation threshold.

In a specific implementation of this step, for example, when it is determined that the cleaning robot is in the second working mode such as a charging mode/mopping mode, the second accumulation threshold corresponding to the charging mode is determined. For example, the second accumulation threshold is 0.1°, and then the target accumulation threshold for deviation/drifting state detection is adjusted to the second accumulation threshold of 0.1°.

For another example, when the working mode of the cleaning robot is switched from a mopping working mode to an automatic cleaning mode of mopping cloth, the first accumulation threshold of 0.001° corresponding to the automatic cleaning mode of the mopping cloth may be obtained by looking up the mapping relationship, and then the current target accumulation threshold is switched from the second accumulation threshold of 0.1° to the first accumulation threshold of 0.001°. Subsequently, the angle change values may be accumulated in real time based on the first accumulation threshold of 0.001°.

In S204, the angle change value(s) detected in real time is(are) compared with the target accumulation threshold, and target angle change value(s) is(are) obtained when it is determined that the angle change value(s) is(are) greater than or equal to the target accumulation threshold; and respective target angle change value(s) are accumulated to obtain the accumulated change value.

In this step, after the target accumulation threshold is obtained, the angle change value(s) detected in real time may be selected based on the target accumulation threshold. That is, the angle change value(s) greater than or equal to the target accumulation threshold is(are) selected as target angle change value(s) so as to accumulate the target angle change value(s).

In a specific implementation of this step, for example, when it is determined that the cleaning robot is in the second working mode such as a charging mode/mopping mode, after it is determined that the second accumulation threshold corresponding to the charging mode is 0.1°, that is, after the target accumulation threshold for deviation/drifting state detection is adjusted to the second accumulation threshold of 0.1°, absolute value(s) of the angle change value(s) detected in real time may be compared with the second accumulation threshold of 0.1°. When the absolute value(s) of the angle change value(s) is(are) greater than or equal to the second accumulation threshold of 0.1°, the angle change value(s) is(are) accumulated. For example, when the angle change values detected in real time within a preset duration are −0.45°, +0.002°, −0.6°, +0.45° . . . , the angle change values of −0.45°, −0.6° and +0.45° whose absolute values are greater than the second accumulation threshold can be accumulated to obtain the accumulated change value of −0.6°.

For another example, when the working mode of the cleaning robot is switched from the mopping working mode to the automatic cleaning mode of the mopping cloth, after the first accumulation threshold of 0.001° corresponding to the automatic cleaning mode of the mopping cloth is obtained, that is, after the current target accumulation threshold is switched from the second accumulation threshold of 0.1° to the first accumulation threshold of 0.001°, the angle change value(s) may be accumulated in real time based on the first accumulation threshold of 0.001°. For example, the angle change values detected in real time within the preset duration are −0.04°, +0.5°, −0.06°, +0.5° . . . , and the angle change values of −0.04°, +0.5°, −0.06° and +0.5° whose absolute values are greater than the first accumulation threshold can be accumulated to obtain an accumulated change value of +0.9°. Since in the automatic cleaning mode of the mopping cloth, the mopping cloth is scraped by a washing component at a high frequency in a left-right direction repeatedly, the angle change value will change continuously in a short period of time. If the above method is used in this scenario, the tiny angle changes of "−0.04°" and "−0.06°" generated in the automatic cleaning mode of the mopping cloth can also be accumulated, and this can avoid a situation that the accumulated change value is accumulate as 1° because these tiny angle changes are filtered out. Thus, the accumulated change value obtained via accumulation in the automatic cleaning mode of the mopping cloth is more accurate, thereby avoiding the problem that the state determination of the cleaning robot is not accurate enough because the accumulated change value is inaccurate due to the use of a fixed accumulation threshold.

In S205, the accumulated change value is compared with a preset state threshold; whether the state of the cleaning robot is a deviation state is determined when it is determined that the accumulated change value is greater than the state threshold; and whether the state of the cleaning robot is a non-deviation state is determined when it is determined that the accumulated change value is less than or equal to the state threshold.

In a specific implementation of this step, the state threshold refers to an accumulation angle critical value for determining whether the cleaning robot deviates/whether the cleaning robot is moved. For example, this accumulation angle critical value may be set as 0.1°, 0.3°, 0.5°, 1° or 1.5°, etc., or may also be adjusted according to actual needs. For example, if the state threshold is set as 0.95°, when the accumulated angle value corresponding to the current moment is detected to be +1°, it may be determined that the cleaning robot is in the deviation state. If the accumulated angle value corresponding to the current moment is detected to be +0.9°, it may be determined that the cleaning robot is in the non-deviation state.

In this step, in order to determine the state of the cleaning robot more accurately, the state may also be determined in combination with a duration of the accumulated change value. That is, when it is determined that the accumulated change value is greater than the state threshold and the duration reaches a predetermined time, it is determined that the cleaning robot is in the deviation state; or when it is determined that the accumulated change value is less than or equal to the state threshold, or when the accumulated change value is greater than the state threshold and the duration does not reach the predetermined time, it is determined that the cleaning robot is in the non-deviation state. For example, the state threshold is set as 10°, and when the accumulated angle value corresponding to the current moment is detected to be 11°, the accumulated change value at a next moment may be obtained continuously. If the accumulated change value at the next moment is acquired as 12°, which is still greater than the state threshold, it is determined that the duration has reached the predetermined time, and then it is determined that the state of the cleaning robot is the deviation state. Conversely, when it is detected that the accumulated change value corresponding to the current moment is 5°, which is less than 10°, it is determined that the state of the cleaning robot is the non-deviation state; or when it is detected that the accumulated change value corresponding to the current moment is 12°, which is greater than 10°, but the accumulated change value corresponding to the next moment is 6°, which is less than 10°, it is still determined that the state of the cleaning robot is the non-deviation state. This can prevent misjudgment of the deviation state caused by a single erroneous accumulation or incomplete accumulated data, thereby making determination of the state of the cleaning robot more accurately and reliably.

In a specific implementation of this embodiment, when it is determined that the state of the cleaning robot is the deviation state, the method further includes: outputting prompt information in a predetermined manner to provide a deviation state prompt. The predetermined mode may be a voice prompt manner, a text prompt manner, a manner of remotely sending information to a designated terminal device, etc. For example, a piece of predetermined prompt music is outputted in the voice prompt manner, or a predetermined prompt text is outputted in the text prompt manner, or prompt information such as text(s) and picture(s) is remotely sent to the designated terminal device, so that a user can know the state of the cleaning robot in a timely manner.

In embodiments of the present disclosure, the working mode of the cleaning robot is acquired in real time, so that when its working mode is a mode with swinging/shaking, for example, it is a mopping cloth cleaning mode, the accumulation threshold may be readjusted according to the mode, that is, the accumulation threshold is adjusted to be smaller. Thus, smaller angle change values caused by the fact that the cleaning robot shakes in left-right direction at a high frequency due to scraping can also be accumulated, thereby avoiding the problem that the accumulated change value exceeds the state threshold because the smaller angle change values are not accumulated and only the larger angle change values are accumulated when a fixed larger threshold is used. The embodiments of the present disclosure can avoid that the cleaning robot mistakenly considers that it has shifted/deviated. In such a way, the problem that the state determination of the cleaning robot is not accurate enough can be solved.

Figure 3:
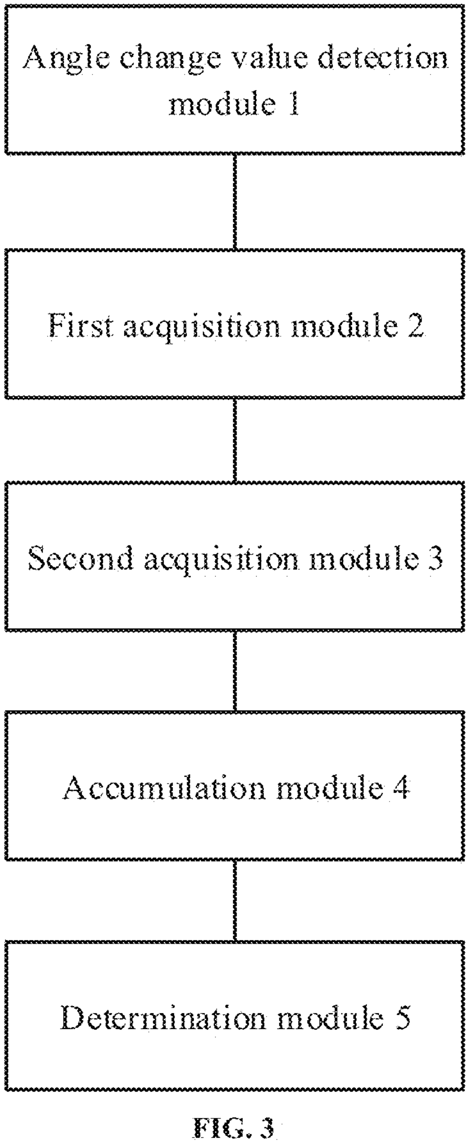
FIG. 3 is a structural block diagram of a state determination apparatus for a cleaning robot according to still another embodiment of the present disclosure.

Yet another embodiment of the present disclosure provides a state determination apparatus for a cleaning robot, as shown in FIG. 3. The apparatus includes:

- an angle change value detection module 1 configured to detect an angle change value of the cleaning robot in real time;
- a first acquisition module 2 configured to acquire a working mode of the cleaning robot in real time;
- a second acquisition module 3 configured to, based on the working mode, acquire a target accumulation threshold corresponding to the working mode;
- an accumulation module 4 configured to, based on the target accumulation threshold, perform selection and accumulation of the respective angle change values detected by the angle change value detection module within a preset duration to obtain an accumulated change value; and
- a determination module 5 configured to determine a state of the cleaning robot based on the accumulated change value.

In a specific implementation of this embodiment, the working mode includes any one of the following: a first working mode with a swinging state and a second working mode with a non-swinging state.

The second acquisition module is specifically configured to: based on the first working mode, acquire a first accumulation threshold corresponding to the first working mode to obtain the target accumulation threshold; or based on the second working mode, acquire a second accumulation threshold corresponding to the second working mode to obtain the target accumulation threshold, where the first accumulation threshold is less than the second accumulation threshold.

In a specific implementation of this embodiment, the accumulation module is specifically configured to: within the preset duration, compare the angle change value(s) detected in real time with the target accumulation threshold; obtain target angle change value(s) when it is determined that the angle change value(s) is(are) greater than or equal to the target accumulation threshold; and accumulate the respective target angle change values within the preset duration to obtain the accumulated change value.

Specifically, the determination module is specifically configured to: compare the accumulated change value with a preset state threshold; determine that the state of the cleaning robot is a deviation state when it is determined that the accumulated change value is greater than the state threshold; and determine that the state of the cleaning robot is a non-deviation state when it is determined that the accumulated change value is less than or equal to the state threshold.

The state determination apparatus of the cleaning robot in an embodiment further includes: an establishment module. The establishment module is configured to: establish a mapping relationship between working modes and accumulation thresholds based on the respective working modes and the respective accumulation thresholds before the working mode of the cleaning robot is acquired in real time. Specifically, the second acquisition module is specifically configured to: obtain the target accumulation threshold corresponding to the working mode by looking up the mapping relationship based on the working mode.

In the specific implementation of the embodiment, an angle range of the first accumulation threshold is 0.0001° to 0.003°; and an angle range of the second accumulation threshold is 0.01° to 0.3°.

The state determination apparatus of the cleaning robot in this embodiment further includes a prompt module. The prompt module is configured to output prompt information in a predetermined manner to provide a deviation state prompt.

Through the description of the above embodiments, those skilled in the art can clearly understand that the present disclosure may be implemented through hardware, or may be implemented by software plus a necessary general hardware platform. Based on such understanding, the technical solutions of the present disclosure can be embodied in the form of a software product. The software product may be stored in a non-volatile storage medium (which may be a CD-ROM, a USB flash disk, a mobile hard disk, etc.), and includes a number of instructions for enabling a computer device (which may be a personal computer, a server, or a network device, etc.) to perform the methods described in the various implementation scenarios of the present disclosure.

Those skilled in the art will understand that the accompanying drawings are merely schematic diagrams of a preferred implementation scenario, and the modules or processes in the accompanying drawings are not necessarily required for implementing the present disclosure.

Those skilled in the art will understand that various modules in the apparatus in an implementation scenario can be distributed in the apparatus of the implementation scenario according to the description of the implementation scenario, or may be changed accordingly and located in one or more apparatuses different from the present implementation scenario. The modules of the above implementation scenario may be combined into one module, or may be further split into a plurality of sub-modules.

Still yet another embodiment of the present disclosure provides a storage medium storing a computer program. When the computer program is executed by a processor, the following method steps are implemented:

step I, acquiring a working mode of a cleaning robot in real time;

step II, based on the working mode, acquiring a target accumulation threshold corresponding to the working mode;

step III, based on the target accumulation threshold, performing selection and accumulation of respective angle change values detected within a preset duration to obtain an accumulated change value; and step IV, determining a state of the cleaning robot based on the accumulated change value.

For the specific implementations of the above method steps, reference may be made to the embodiments of the state determination method for the cleaning robot mentioned above, and repeated descriptions are omitted here.

In the present disclosure, the target accumulation threshold is adjusted in real time according to the working mode of the cleaning robot, and then angle change value(s) satisfying a condition is(are) accumulated based on the target accumulation threshold. Thus, the accumulated change value obtained via accumulation is more accurate and reliable, thereby providing a guarantee for subsequent accurate determination of the state of the cleaning robot based on the accumulated change value.

Yet still another embodiment of the present disclosure provides an electronic device. The electronic device at least includes a memory and a processor. The memory stores a computer program thereon, and the processor implements the following method steps when executing the computer program on the memory:

step I, acquiring a working mode of a cleaning robot in real time;

step II, based on the working mode, acquiring a target accumulation threshold corresponding to the working mode;

step III, based on the target accumulation threshold, performing selection and accumulation of respective angle change values detected within a preset duration to obtain an accumulated change value; and step IV, determining a state of the cleaning robot based on the accumulated change value.

For the specific implementation of the above method steps, reference may be made to any embodiment of the state determination method for the cleaning robot mentioned above, and repeated descriptions are omitted here.

In the present disclosure, the target accumulation threshold is adjusted in real time according to the working mode of the cleaning robot, and then angle change value(s) satisfying a condition is(are) accumulated based on the target accumulation threshold. Thus, the accumulated change value obtained via accumulation is more accurate and reliable, thereby providing a guarantee for subsequent accurate determination of the state of the cleaning robot based on the accumulated change value.

In some embodiments, the working mode includes any one of: a first working mode with a swinging state and a second working mode with a non-swinging state.

Based on the working mode, acquiring the target accumulation threshold corresponding to the working mode specifically includes:

based on the first working mode, acquiring a first accumulation threshold corresponding to the first working mode to obtain the target accumulation threshold; or based on the second working mode, acquiring a second accumulation threshold corresponding to the second working mode to obtain the target accumulation threshold, where the first accumulation threshold is less than the second accumulation threshold.

In some embodiments, based on the target accumulation threshold, performing selection and accumulation of respective angle change values detected within the preset duration to obtain the accumulated change value specifically includes:

within the preset duration, comparing an angle change value detected in real time with the target accumulation threshold, and obtaining a target angle change value when it is determined that the angle change value is greater than or equal to the target accumulation threshold; and accumulating respective angle change values within the preset duration to obtain the accumulated change value.

In some embodiments, determining the state of the cleaning robot based on the accumulated change value specifically includes:

comparing the accumulated change value with a preset state threshold;

determining that the state of the cleaning robot is a deviation state when it is determined that the accumulated change value is greater than the state threshold; and determining the state of the cleaning robot is a non-deviation state when it is determined that the accumulated change value is less than or equal to the state threshold.

In some embodiments, before acquiring the working mode of the cleaning robot in real time, the method further includes: establishing a mapping relationship between working modes and accumulation thresholds based on the respective working modes and the respective accumulation thresholds; and based on the working mode, acquiring the target accumulation threshold corresponding to the working mode specifically includes:

acquiring the target accumulation threshold corresponding to the working mode by looking up the mapping relationship based on the working mode.

In some embodiments, an angle range of the first accumulation threshold is 0.0001° to 0.003°; and an angle range of the second accumulation threshold is 0.01° to 0.3°.

In some embodiments, when it is determined that the state of the cleaning robot is the deviation state, the method further includes: outputting prompt information in a predetermined manner to provide a deviation state prompt.

In the state determination method and apparatus for the cleaning robot according to the present disclosure, the target accumulation threshold is adjusted in real time according to the working mode of the cleaning robot, and then angle change value(s) satisfying a condition is(are) accumulated based on the target accumulation threshold. Thus, the accumulated change value obtained via accumulation is more accurate and reliable, thereby providing a guarantee for subsequent accurate determination of the state of the cleaning robot based on the accumulated change value.

The above embodiments are merely example embodiments of the present disclosure and are not intended to limit the present disclosure. The protection scope of the present disclosure is defined by the claims. Those skilled in the art may make various modifications or equivalent substitutions to the present disclosure within the essence and protection scope of the present disclosure, and such modifications or equivalent substitutions should also be regarded as falling within the protection scope of the present disclosure.

What is claimed is:

1. A state determination method for a cleaning robot, comprising:

acquiring a working mode of the cleaning robot in real time;

based on the working mode, acquiring a target accumulation threshold corresponding to the working mode;

based on the target accumulation threshold, performing selection and accumulation of respective angle change values detected within a preset duration to obtain an accumulated change value; and determining a state of the cleaning robot based on the accumulated change value;

wherein before acquiring the working mode of the cleaning robot in real time, the method further comprises: establishing a mapping relationship between working modes and accumulation thresholds based on respective working modes and respective accumulation thresholds; and wherein acquiring the target accumulation threshold corresponding to the working mode based on the working mode comprises:

acquiring the target accumulation threshold corresponding to the working mode by looking up the mapping relationship based on the working mode.

2. The method according to claim 1, wherein the working mode comprises any: a first working mode or a second working mode;

wherein in response to the working mode being the first working mode, a first accumulation threshold corresponding to the first working mode is acquired to obtain the target accumulation threshold; or wherein response to the working mode being the second working mode, a second accumulation threshold corresponding to the second working mode is acquired to obtain the target accumulation threshold, wherein the first accumulation threshold is less than the second accumulation threshold.

3. The method according to claim 2, wherein:

an angle range of the first accumulation threshold is 0.0001° to 0.003°; and an angle range of the second accumulation threshold is 0.01° to 0.3°.

4. The method according to claim 1, wherein based on the target accumulation threshold, performing selection and accumulation of the respective angle change values detected within the preset duration to obtain the accumulated change value comprises:

comparing the respective angle change values detected in real time within the preset duration with the target accumulation threshold, and selecting at least one angle change value which is greater than or equal to the target accumulation threshold as at least one target angle change value; and performing accumulation of the at least one target angle change value within the preset duration to obtain the accumulated change value.

5. The method according to claim 1, wherein determining the state of the cleaning robot based on the accumulated change value comprises:

comparing the accumulated change value with a preset state threshold;

determining that the state of the cleaning robot is a deviation state when it is determined that the accumulated change value is greater than the state threshold; and determining that the state of the cleaning robot is a non-deviation state when it is determined that the accumulated change value is less than or equal to the state threshold.

6. The method according to claim 5, wherein in response to determining that the state of the cleaning robot is the deviation state, the method further comprises: outputting prompt information in a predetermined manner to provide a deviation state prompt.

7. A non-transitory storage medium storing a computer program, wherein when the computer program is executed by a processor of an electronic device, the electronic device is caused to:

acquire a working mode of a cleaning robot in real time;

based on the working mode, acquire a target accumulation threshold corresponding to the working mode;

based on the target accumulation threshold, perform selection and accumulation of respective angle change values detected within a preset duration to obtain an accumulated change value; and determine a state of the cleaning robot based on the accumulated change value;

wherein when the computer program is executed by the processor, the electronic device is caused to before the working mode of the cleaning robot is acquired in real time, establish a mapping relationship between working modes and accumulation thresholds based on respective working modes and respective accumulation thresholds; and wherein acquiring the target accumulation threshold corresponding to the working mode based on the working mode comprises:

acquiring the target accumulation threshold corresponding to the working mode by looking up the mapping relationship based on the working mode.

8. An electronic device comprising a memory and a processor, wherein the memory stores a computer program thereon, and when the computer program is executed by the processor, the electronic device is caused to:

acquire a working mode of the cleaning robot in real time;

based on the working mode, acquire a target accumulation threshold corresponding to the working mode;

based on the target accumulation threshold, perform selection and accumulation of respective angle change values detected within a preset duration to obtain an accumulated change value; and determine a state of the cleaning robot based on the accumulated change value;

wherein when the computer program is executed by the processor, the electronic device is caused to before the working mode of the cleaning robot is acquired in real time, establish a mapping relationship between working modes and accumulation thresholds based on respective working modes and respective accumulation thresholds; and wherein acquiring the target accumulation threshold corresponding to the working mode based on the working mode comprises:

acquiring the target accumulation threshold corresponding to the working mode by looking up the mapping relationship based on the working mode.

9. The electronic device according to claim 8, wherein the working mode comprises: a first working mode or a second working mode; and wherein in response to the working mode being the first working mode, a first accumulation threshold corresponding to the first working mode is acquired to obtain the target accumulation threshold; or wherein in response to the working mode being the second working mode, a second accumulation threshold corresponding to the second working mode is acquired to obtain the target accumulation threshold, wherein the first accumulation threshold is less than the second accumulation threshold.

10. The electronic device according to claim 9, wherein:

an angle range of the first accumulation threshold is 0.0001° to 0.003°; and an angle range of the second accumulation threshold is 0.01° to 0.3°.

11. The electronic device according to claim 8, wherein when the computer program is executed by the processor, the electronic device is caused to:

compare the respective angle change values detected in real time within the preset duration with the target accumulation threshold, and select at least one angle change value which is greater than or equal to the target accumulation threshold as at least one target angle change value; and perform accumulation of the at least one target angle change value within the preset duration to obtain the accumulated change value.

12. The electronic device according to claim 8, wherein when the computer program is executed by the processor, the electronic device is caused to:

compare the accumulated change value with a preset state threshold;

determine that the state of the cleaning robot is a deviation state when it is determined that the accumulated change value is greater than the state threshold; and determine that the state of the cleaning robot is a non-deviation state when it is determined that the accumulated change value is less than or equal to the state threshold.

13. The electronic device according to claim 12, wherein when the computer program is executed by the processor, the electronic device is caused to in response to determining that the state of the cleaning robot is the deviation state, output prompt information in a predetermined manner to provide a deviation state prompt.

* * * * *